(12) United States Patent
Takehara

(10) Patent No.: US 12,646,228 B2
(45) Date of Patent: Jun. 2, 2026

(54) DISPLAY DEVICE, METHOD OF CONTROLLING DISPLAY DEVICE, AND COMPUTER-READABLE STORAGE MEDIUM

(71) Applicant: JVCKENWOOD Corporation, Yokohama (JP)

(72) Inventor: Yuya Takehara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 170 days.

(21) Appl. No.: 18/608,972

(22) Filed: Mar. 19, 2024

(65) Prior Publication Data

US 2024/0221240 A1     Jul. 4, 2024

Related U.S. Application Data

(63) Continuation of application No. PCT/JP2022/034215, filed on Sep. 13, 2022.

(30) Foreign Application Priority Data

Sep. 27, 2021     (JP) ................................. 2021-157245

(51) Int. Cl.
G06T 11/00          (2026.01)
G06T 7/50          (2017.01)
(Continued)

(52) U.S. Cl.
CPC ................ G06T 11/00 (2013.01); G06T 7/50 (2017.01); G06T 7/73 (2017.01); G06V 10/74 (2022.01); *G06T 2207/20221* (2013.01)

(58) Field of Classification Search
None
See application file for complete search history.

(56) References Cited

U.S. PATENT DOCUMENTS

2009/0262113 A1     10/2009   Kotake et al.
2017/0017830 A1     1/2017   Hanai
(Continued)

FOREIGN PATENT DOCUMENTS

JP          2009-252112          10/2009
JP          2019-175294          10/2019
WO          2015/093129          6/2015

OTHER PUBLICATIONS

International Search Report and Written Opinion for International Application Serial No. PCT/JP2022/034215 mailed on Nov. 15, 2022, 8 pages.

(Continued)

*Primary Examiner* — Yanna Wu
(74) *Attorney, Agent, or Firm* — Amin, Turocy & Watson, LLP

(57)          ABSTRACT

A display device includes: a real object information acquisition unit configured to acquire information on a position of a real object in a real space in which a user exists and information on a positional relationship in the real space between the real object and the user; a virtual object information acquisition unit configured to acquire information on a position of a virtual object in a virtual space; and a user position acquisition unit configured to match positions and postures of the real object and the virtual object, calculate a positional relationship in the virtual space between the virtual object and the user based on the information on the positional relationship, and acquire user positional information indicating a position of the user in the virtual space based on the positional relationship.

5 Claims, 7 Drawing Sheets

(51) Int. Cl.
    *G06T 7/73*           (2017.01)
    *G06V 10/74*       (2022.01)

(56)                  References Cited

U.S. PATENT DOCUMENTS

| | | | |
|---|---|---|---|
| 2018/0190022 A1* | 7/2018 | Zamir | .................. G06T 19/006 |
| 2020/0019755 A1 | 1/2020 | Hanai | |
| 2020/0042080 A1* | 2/2020 | Lyren | ..................... G06F 3/011 |

OTHER PUBLICATIONS

Extended European Search Report for European Patent Application No. 22872772.3 dated Dec. 23, 2024.

* cited by examiner

DISPLAY DEVICE, METHOD OF CONTROLLING DISPLAY DEVICE, AND COMPUTER-READABLE STORAGE MEDIUM

CROSS-REFERENCE TO RELATED APPLICATIONS

This application is a Continuation of International Application No. PCT/JP2022/034215, filed on Sep. 13, 2022, which designates the United States, incorporated herein by reference, and which claims the benefit of priority from Japanese Patent Application No. 2021-157245, filed on Sep. 27, 2021, incorporated herein by reference.

BACKGROUND

The present invention relates to a display device, a method of controlling the display device, and a computer-readable storage medium.

There has been a significant evolution in information devices recently. Not only smartphones that are a typical example of such information devices but also what is called as wearable devices that are worn by users have become used commonly as such information devices. There are, as wearable devices, HMDs (Head Mount Display) that provide visual information as wearable devices and are used for AR (Augmented Reality), VR (Virtual Reality), etc. For example, a HMD that adjusts the position of an object that is displayed on an output unit of the HMD using a predetermined AR marker is disclosed in Japanese Laid-open Patent Publication No. 2019-175294.

When a wearable device provides a virtual space to a user, the user is able to determine a position of the user in the virtual space freely. When the positions of the user with respect to an object in the real space and the virtual space do not match, however, there is a risk that behaviors of the user in the virtual space would be unnatural.

SUMMARY

A display device according to one aspect of the present disclosure includes: a real object information acquisition unit configured to acquire information on a position of a real object that is an object in a real space in which a user exists and information on a positional relationship in the real space between the real object and the user, the position being in the real space; a virtual object information acquisition unit configured to acquire information on a position of a virtual object that is an object in a virtual space, the position being in the virtual space; and a user position acquisition unit configured to match positions and postures of the real object and the virtual object, calculate a positional relationship in the virtual space between the virtual object and the user in the virtual space based on the information on the positional relationship in the real space, and acquire user positional information indicating a position of the user in the virtual space based on the positional relationship in the virtual space.

A method of controlling a display device according to another aspect of the present disclosure includes: acquiring information on a position of a real object that is an object in a real space in which a user exists and information on a positional relationship in the real space between the real object and the user, the position being in the real space; acquiring information on a position of a virtual object that is an object in a virtual space, the position being in the virtual space; and matching positions and postures of the real object and the virtual object, calculating a positional relationship in the virtual space between the virtual object and the user in the virtual space based on the information on the positional relationship in the real space, and acquiring user positional information indicating a position of the user in the virtual space based on the positional relationship in the virtual space.

A non-transitory computer-readable storage medium according to still another aspect of the present disclosure stores a program causing a computer to execute: acquiring information on a position of a real object that is an object in a real space in which a user exists and information on a positional relationship in the real space between the real object and the user, the position being in the real space; acquiring information on a position of a virtual object that is an object in a virtual space, the position being in the virtual space; and matching positions and postures of the real object and the virtual object, calculating a positional relationship in the virtual space between the virtual object and the user in the virtual space based on the information on the positional relationship in the real space, and acquiring user positional information indicating a position of the user in the virtual space based on the positional relationship in the virtual space.

DETAILED DESCRIPTION

Figure 1:
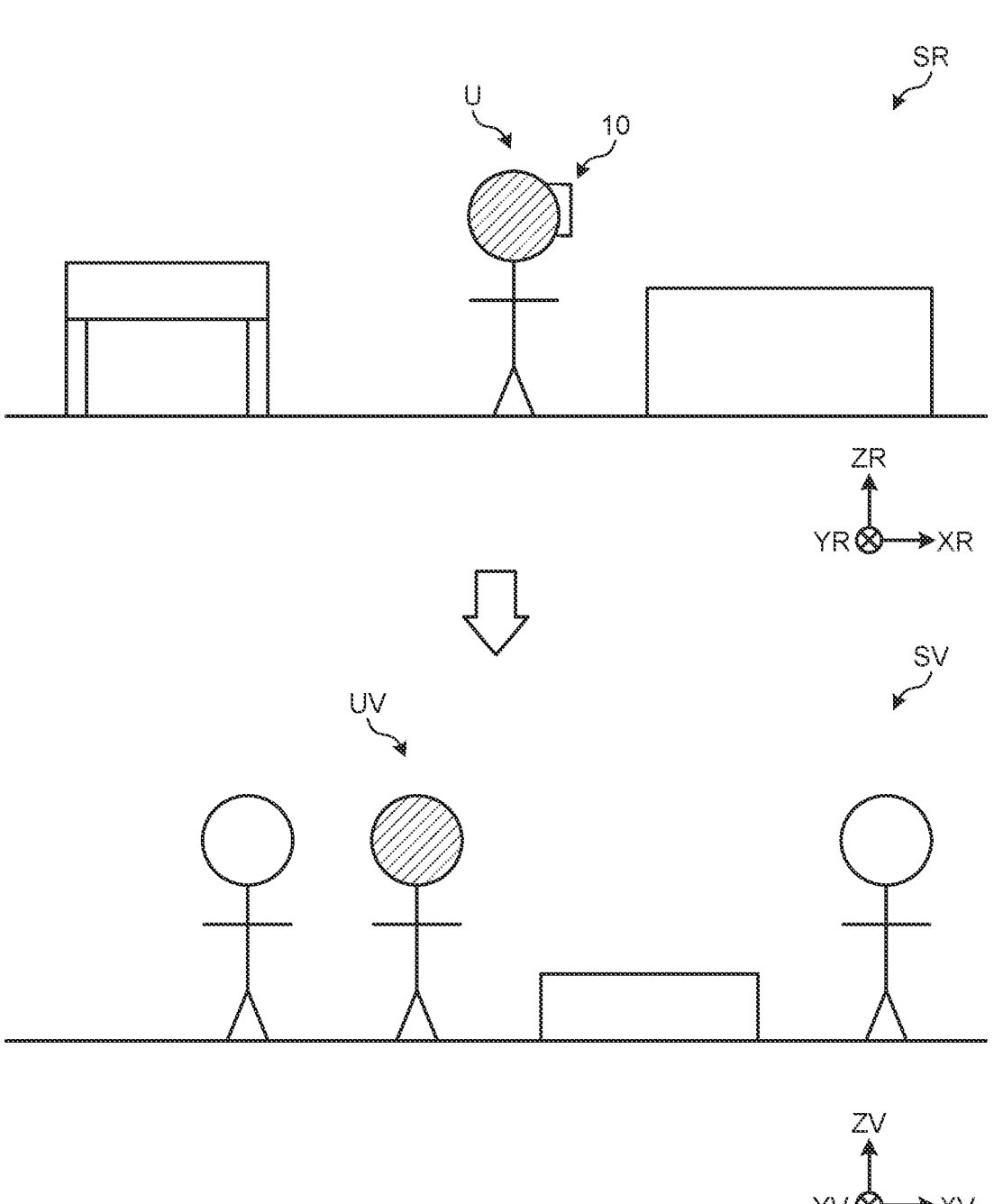
FIG. 1 is a schematic diagram illustrating an example of a real space and a virtual space.

The present embodiment will be described in detail below based on the drawings. Note that the embodiment described below do not limit the present embodiment.
Real Space and Virtual Space FIG. 1 is a schematic diagram illustrating an example of a real space and a virtual space. A display device 10 according to the present embodiment is a display device that displays an image. As illustrated in FIG. 1, the display device 10 is what is referred to as a HMD (Head Mount Display) that is worn on the head of a user U. The display device 10 displays an image and thereby provides a virtual space to the user U. As illustrated in FIG. 1, a real space in which the user U exists actually is a real space SR and the virtual space that is provided by the display device 10 to the user U is a virtual space SV. In this case, the display device 10 displays an image for the virtual space SV according to a motion (line of sight) of the user U in the real space SR. In other words, simulating that the user U moves in the virtual space SV as a user UV, the display device 10 displays the image for the virtual space SV. Thus, the user U is able to recognize that the user U exists in the virtual space SV. Note that the virtual space SV may be MR (Mixed Reality), that is, a space obtained by reproducing an existing place distant from a place where the user U exists or a virtual space that does not exist actually, that is, VR (virtual reality). A direction along a horizontal direction in a coordinate system of the real space SR is referred to as a direction XR, a direction along the horizontal direction and orthogonal to the direction XR is referred to as a direction YR, and a vertical direction is referred to as a direction ZR below. A direction along a horizontal direction in a coordinate system of the virtual space SV is referred to as a direction XV, a direction along the horizontal direction and orthogonal to the direction XV is referred to as a direction YV, and a vertical direction is referred to as a direction ZV.

Display System

Figure 2:
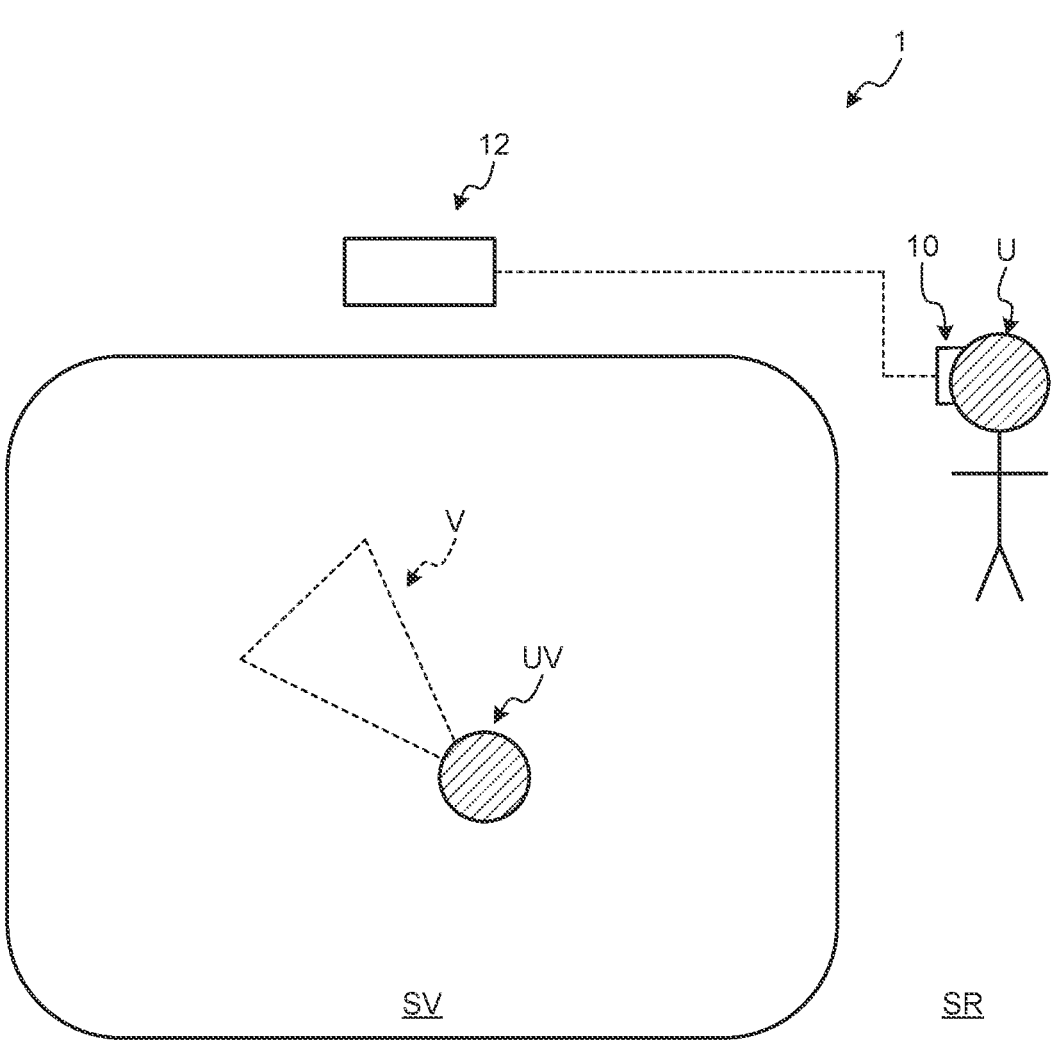
FIG. 2 is a schematic diagram of a display system according to the present embodiment.

FIG. 2 is a schematic diagram of a display system according to the present embodiment. As illustrated in FIG. 2, a display system 1 according to the present embodiment includes the display device 10 and an information process-ing device 12. In the present embodiment, the display system 1 provides the virtual space SV to the user U. In the example in FIG. 1, the user U wears the display device 10 and the display device 10 provides an image in the virtual space SV in a field of view V of the user UV in the virtual space SV as an image for the virtual space SV to the user U. Note that the number of avatars in the virtual space SV (that is, the number of users U to which the common virtual space SV is provided) may be any number. In FIG. 2 and the following figures, the virtual space SV is presented in a two-dimensional plane viewed from the above in the vertical direction; however, the virtual space SV may be a three-dimensional space.

The information processing device 12 is a device that performs information processing on information for the virtual space SV. The information processing device 12 can be referred to as a server that transmits and receives infor-mation to and from the display device 10 of the user U and performs image processing on images for the virtual space SV. For example, the information processing device 12 is a computer that includes a computing device including com-puting circuitry, such as a CPU (Central Processing Unit), and a storage unit and executes processing by reading and executing a program (software) from the storage.

Display Device

Figure 3:
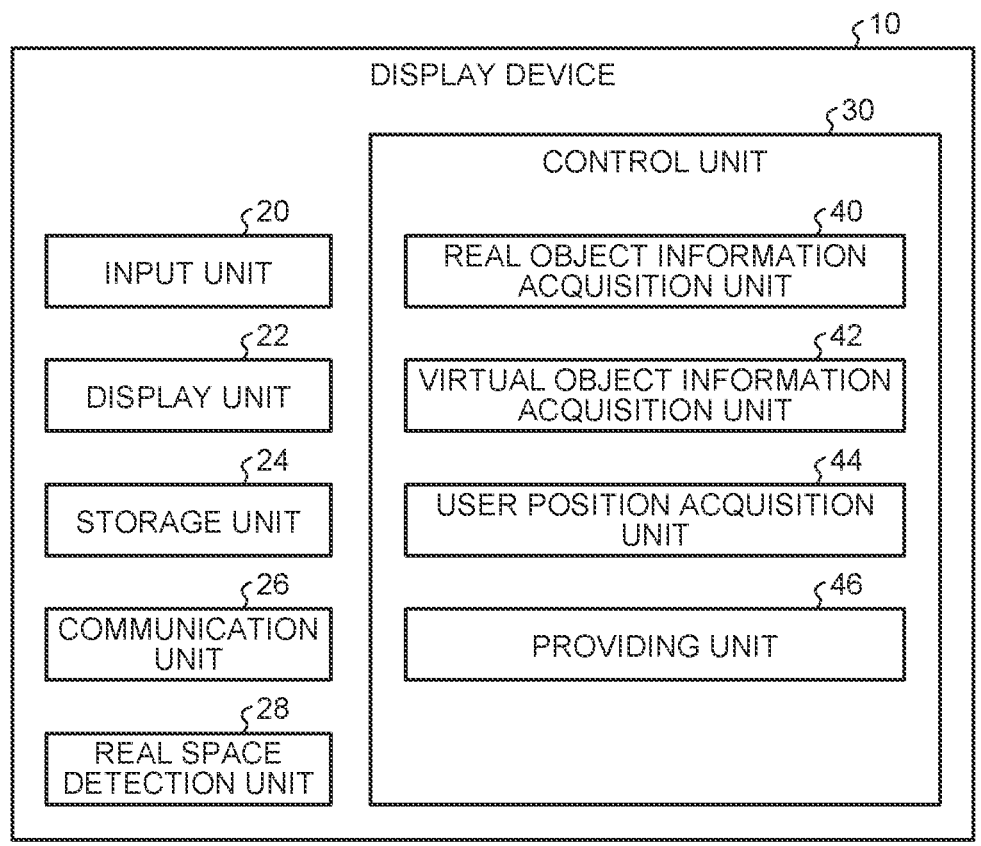
FIG. 3 is a schematic block diagram of a display device according to the present embodiment.

FIG. 3 is a schematic block diagram of the display device according to the present embodiment. The display device 10 can be also referred to as a computer and, as illustrated in FIG. 3, includes an input unit 20, a display unit 22, a storage unit 24, a communication unit 26, a real space detection unit 28, and a control unit 30. The input unit 20 may be a system that receives an operation performed by the user U and, for example, may be a controller or a microphone that is provided in, for example, the HMD. The display unit 22 is a display that displays an image. The display unit 22 outputs the image and thereby provides the virtual space SV to the user U. The display device 10 may include, in addition to display unit 22, a device that outputs information, such as a speaker that outputs sound.

The storage unit 24 is a memory that stores various types of information, such as the content of computing by the control unit 30 and programs and, for example, includes at least one of a main storage device, such as a RAM (Random Access Memory) or a ROM (Read Only Memory), and an external storage device, such as a HDD (Hard Disk Drive). A program for the control unit 30 that the storage unit 24 stores may be stored in a recording medium readable by the display device 10.

The communication unit 26 is a communication module that communicates with an external device and is, for example, an antenna, or the like. The display device 10 communicates with an external device, such as the infor-mation processing device 12, by wireless communication; however, the communication may be wired communication, and communication method may be any method.

The real space detection unit 28 is a sensor that detects a position of the user U, a posture of the user U, and the surroundings of the display device 10 (user U) in the real space SR. The position of the user U refers to the position of the user U on an XR-YR plane with the initial position of the user U serving as the origin. The initial position of the user U refers to a position in the real space SR at the time when the display device 10 starts, that is, the initial position of the user U at the time when the display device 10 is used. The posture of the user U refers to a magnitude of an angle formed by the XR-YR plane and the direction in which the display device 10 faces (the direction in which the user U faces). The real space detection unit 28, for example, detects the position of the user U using an acceleration sensor, detects the posture of the user U using a gyro sensor, and detects the surroundings of the display device 10 (user U) using a 3D camera, such as a stereo camera or a ToF (Time of Flight) camera. Note that the real space detection unit 28 is not limited to this configuration if the real space detection unit 28 is able to detect the position of the user U in the real space SR, the posture of the user U, and an object existing in the real space SR around the display device 10 (user U). For example, the real space detection unit 28 may detect an object existing in the real space SR by LIDAR (Light Detection And Ranging) or may detect the posture of the user U using the image of the real space SR that is captured by a camera.

The control unit 30 is an arithmetic unit and, for example, includes arithmetic circuitry, such as a CPU (Central Pro-cessing Unit). The control unit 30 includes a real object information acquisition unit 40, a virtual object information acquisition unit 42, a user position acquisition unit 44, and a providing unit 46. The control unit 30 reads a program (software) from the storage unit 24 and executes the pro-gram and thereby realizes the real object information acqui-sition unit 40, the virtual object information acquisition unit 42, the user position acquisition unit 44, and the providing unit 46 and executes processes thereof. Note that the control unit 30 may execute these processes using a single CPU or may include a plurality of CPUs and execute the processes using the CPUs. At least part of the processes performed by the real object information acquisition unit 40, the virtual object information acquisition unit 42, the user position acquisition unit 44, and the providing unit 46 may be realized by hardware circuitry.

Real Object Acquisition Unit

The real object information acquisition unit 40 acquires information on a real object OR. The real object OR refers to an object existing around the display device 10 (user U) in the coordinate system of the real space SR. The informa-tion on the real object OR contains information presenting a positional relationship between the user U and the real object OR (relative positional information on the real object OR) and information indicating the position of the real object OR in the real space SR (absolute positional infor-mation on the real object OR). The information on the real object OR preferably contains information indicating the shape of the real object OR in the real space SR (shape information on the real object OR). In the present embodi-ment, the real object information acquisition unit 40 controls the real space detection unit 28 and causes the real space detection unit 28 to detect an object around the display device 10 (user U). The real object information acquisition unit 40 extracts a plurality of feature points and areas in the detected object from the result of the detection by the real space detection unit 28 using a known technique and, based on the result of the extraction, acquires the area as the information on the real object OR. Note that a method of acquiring the information on the real object OR is not limited to detection by the real space detection unit 28. For example, information on positions and shapes of furniture in a room of the user U, etc., may be set previously as the information on the real object OR and the real object information acquisition unit 40 may acquire the set information on the real object OR.

Figure 4:
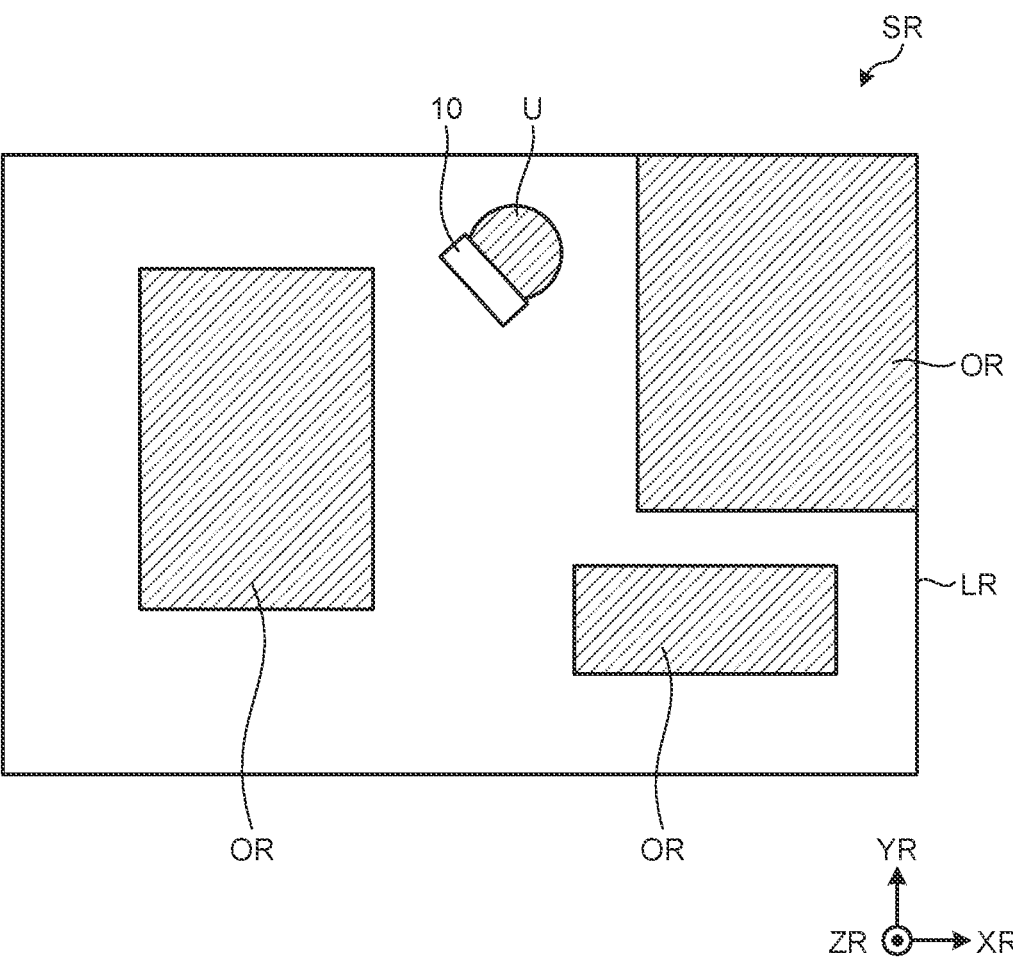
FIG. 4 is a schematic diagram illustrating an example of the real space.

FIG. 4 is a schematic diagram illustrating an example of the real space. FIG. 4 is an example of a plane view of the real space SR viewed from a ZR direction. The real object information acquisition unit 40 acquires the relative positional information on the real object OR and the shape information on the real object OR as the information on the real object OR. In other words, it can be also described that the real object information acquisition unit 40 acquires information indicating the position occupied by the real object OR in the real space SR with respect to the position of the user U as the information on the real object OR.

The type of the real object OR to be acquired by the real object information acquisition unit 40 may be any type and, in the embodiment, the real object information acquisition unit 40 regards an object (for example, a desk or a wall) that does not move in the real space SR as the real object OR and acquires positional information and shape information on the object that does not move in the real space SR as the information on the real object OR. In the embodiment, the real object information acquisition unit 40 may acquire the information on the real object OR that has a plane and that the user U cannot move based on the information on the real space SR. In this case, the real object information acquisition unit 40 may cause the display unit 22 to display possible real objects OR to be acquired, extract a real object OR that is specified by the user U via the input unit 20 from among the possible real objects OR, and acquire information on the extracted real object OR. Note that the object OR is not limited to being set based in the information on the real space SR. For example, the position of the real object OR, such as layout information on the room of the user U, may be set previously and the real object information acquisition unit 40 may acquire information on the set position of the real object OR.

In the embodiment, the real object information acquisition unit 40 acquires information on the real object OR in a real local space LR that is a space within a given area in the real space SR. In other words, in the embodiment, the object in the area of the real local space LR in the real space SR is extracted as the real object OR and the real object information acquisition unit 40 acquires information on the real object OR in the real local space LR. The real object information acquisition unit 40 acquires a difference between the coordinates of the user U and the coordinates of the real object OR in the real local space LR as the relative positional information on the real object OR. The real local space LR refers to a space of an area with the initial position of the user U serving as the origin, which is the initial position detected by the real space detection unit 28, and the real local space LR can be referred to as a space where it is assumed that the user U behaves in the real space SR. In other words, for example, when the user U shifts in the real space by walking, or the like, the coordinates of the user U in the real local space LR change. Based on the changed coordinates of the user U in the real local space LR, the real object information acquisition unit 40 updates the information on the positional relationship of the real object OR with respect to the user U.

FIG. 4 is an example only and the shapes and the sizes of the real local space LR and the real object OR are not limited to the example in FIG. 4 and they may be any shape and size.

Virtual Object Information Acquisition Unit

The virtual object information acquisition unit 42 acquires information on a virtual object OV. The virtual object OV is a virtual object that exists in the virtual space SV and is a subject that is displayed as an image for the virtual space SV in the coordinate system in the virtual space SV. The information on the virtual object OV contains information indicating the position of the virtual object OV in the virtual space SV (positional information on the virtual object OV). The virtual object information acquisition unit 42 extracts a plurality of feature points and areas in the virtual object OV by a known technique and acquires the result of the extraction as the information on the virtual object OV. The virtual object information acquisition unit 42 may acquire the position (coordinates) of the virtual object OV with respect to the coordinates of the origin of the virtual space SV as the positional information on the virtual object OV or acquire the position (coordinates) of the virtual object OV with respect to a position in which the user UV is set initially in the virtual space SV as the positional information on the virtual object OV. Note that the position in which the user UV is set initially in the virtual space SV is a position that is set previously as a default position of the user UV in the virtual space SV. The virtual object information acquisition unit 42, for example, acquires information on the virtual object OV from the information processing device 12 via the communication unit 26. Note that, in the present embodiment, the virtual space SV is not constructed according to the environment around the user U in the real space SR and is set previously regardless of the environment around the user U in the real space SR. The position of the virtual object OV in the virtual space SV is set previously as the position in which the user UV is set initially is.

Figure 5:
FIG. 5 is a schematic diagram illustrating an example of the virtual space.
Figure 5:
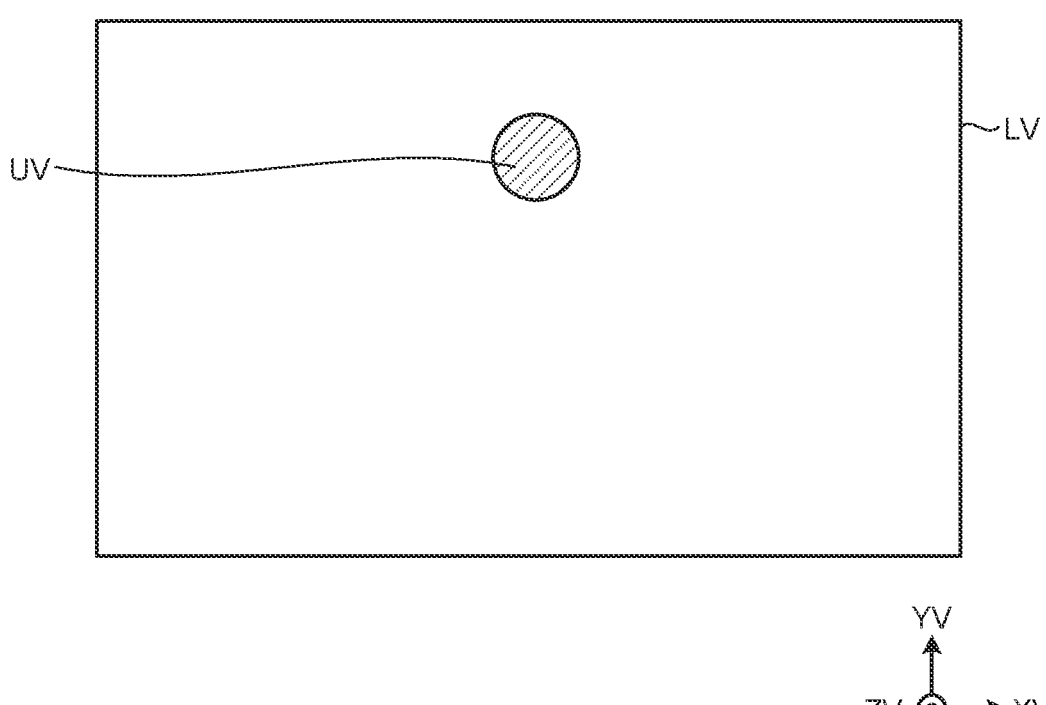

FIG. 5 is a schematic diagram illustrating an example of the virtual space. FIG. 5 is a plane view of the virtual space SV viewed from the ZV direction.

The information on the virtual object OV preferably contains information indicating the shape of the virtual object OV in the virtual space SV (shape information on the virtual object OV). In the present embodiment, the virtual object information acquisition unit 42 extracts the virtual object OV based on the shape information on the real object OR and the shape information on the virtual object OV. For example, the virtual object information acquisition unit 42 extracts the virtual object OV whose shape is similar to the shape of the real object OV from among possible virtual objects OV in the virtual space SV and acquires information on the extracted virtual object OV. The method of extracting the virtual object OV similar to the real object may be any method and, for example, the virtual object information acquisition unit 42 extracts a virtual object OV whose direction, height, and area of a plane have the minimum deviation from the direction, height, and area of a plane of the real object OR (for example, when the real object OR is a desk, an object that has a horizontal plane in the virtual space SV and that is the closest in height to the desk) among the possible virtual objects OV and acquires the information on the virtual object OV. A virtual object OV similar to the real object may be extracted by inputting the shape information on the possible virtual object OV to an AI (Artificial Intelligence) model capable of calculating a similarity to the real object when the shape information on the virtual object OV is input thereto. The virtual object information acquisition unit 42 may cause the display unit 22 to display possible virtual objects OV to be acquired and acquire information on a virtual object OV that is selected by the user U via the input unit 20. The method of extracting the virtual object OV is not limited to this and, for example, the virtual object OV may be extracted previously when the virtual space SV is set or, for example, may be extracted by the virtual object information acquisition unit 42 based on the position of the user UV in the virtual space SV.

In the present embodiment, the virtual object information acquisition unit 42 acquires information on the virtual object OV in a virtual local space LV that is a space in a predetermined area in the virtual space SV. In other words, in the embodiment, a virtual object within the area of the virtual local space LV in the virtual space SV is extracted as the virtual object OV and the virtual object information acquisition unit 42 acquires the information on the virtual object OV in the virtual local space LV. The virtual object information acquisition unit 42 acquires the coordinates of the virtual object OV in the virtual local space LV as the positional information on the virtual object OV. Note that the virtual local space LV refers to the space corresponding to the real local space LR in the virtual space SV and the user UV exists in the same position as that of the user U in the real local space LR. More specifically, for example, when the position and the orientation of the user U in the real local space LR change because of walk of the user U in the real space SR (the real local space LR), the same motions as those in the real space SR are realized in the virtual space SV by changing the position and the orientation of the user UV in the virtual local space LV similarly. The virtual local space LV is sufficiently smaller than the virtual space SV and it is possible to let the virtual local space LV to shift and rotate in the virtual space SV freely. More specifically, for example, when the user U inputs a shift of the user UV using the input unit 20 or rides on a vehicle in the virtual space SV, changing the position and the orientation of each user UV in the virtual local space SV makes it possible to cause the user UV to shift in the virtual space SV with the position of the user UV in the real space SR (the real local space LV) being fixed.

FIG. 5 is an example only and the virtual object SV, the virtual local space LV, and the shape and the size of the virtual object OV are not limited to the example in FIG. 5 and they may any space, any shape, and any size. The virtual object information acquisition unit 42 may acquire the information on the position of the virtual object OV from the storage unit 24.

User Position Acquisition Unit

The user position acquisition unit 44 acquires user positional information. The user positional information is information indicating the position of the user UV in the virtual space SV that is set based on the information on the real object OR that is acquired by the real object information acquisition unit 40 and the information on the virtual object OV that is acquired by the virtual object information acquisition unit 42. Note that, in the present embodiment, the user position acquisition unit 44 sets the user positional information by himself/herself and thereby acquires the user positional information; however, the acquisition is not limited thereto and, for example, the user position acquisition unit 44 may acquire the user positional information that is set by another device or the user positional information that is stored in the storage unit 24 previously.

In the embodiment, the user position acquisition unit 44 sets user positional information using the positional relationship between the virtual object OV and the user UV in the virtual space SV that is calculated based on the positional relationship between the real object OR and the user U. More specifically, the user position acquisition unit 44 sets the user positional information such that the position of the virtual object OV with respect to the user UV in the virtual space SV (the virtual local space LV) corresponds to the position of the real object OR with respect to the user U in the real space SR (real local space LR). In other words, the position of the user UV in the virtual space SV presented by the user positional information is set such that the orientation and the distance from the virtual object OV to the user UV correspond to (more preferably match) the orientation and the distance from the real object OR to the user U in the real space SR. A specific method of setting user positional information will be described below.

Figure 6:
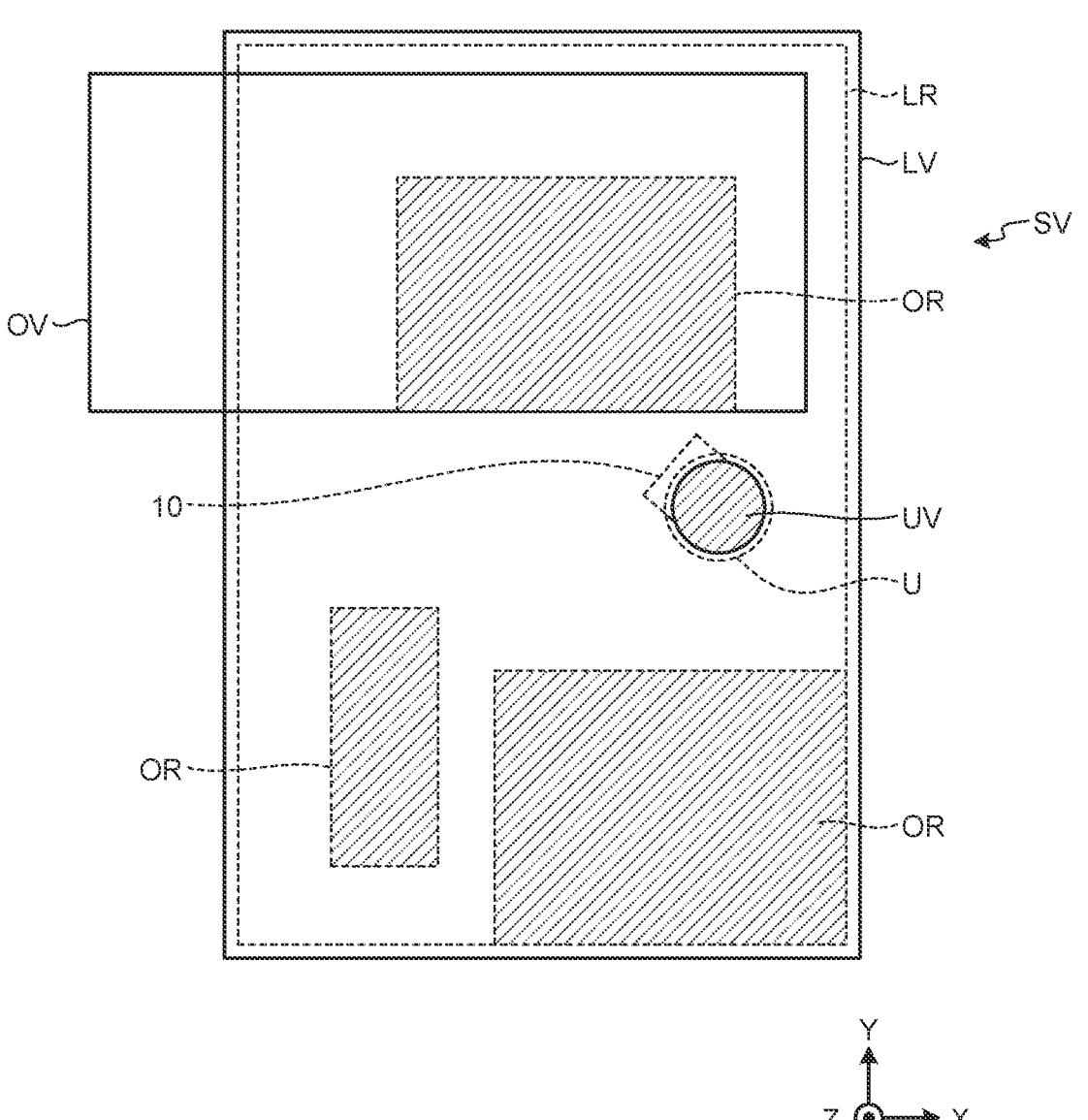
FIG. 6 is a schematic diagram illustrating an example in which a real local space is superimposed on a virtual space.

FIG. 6 is a schematic diagram illustrating an example in which the real local space is superimposed onto the virtual space. In the present embodiment, the user positional information is information for superimposing the virtual local space LV containing the user UV onto the virtual space SV containing the virtual object OV, in other words, is information on the position and orientation of the virtual local space LV in the virtual local space LV. In other words, the user positional information can be also referred to as a value for converting the coordinate system of the real local space LR into the coordinate system of the virtual space SV via the virtual local space LV. In the example in FIG. 6, a direction along a horizontal direction in the virtual local space LV is referred to as a direction X, a direction along the horizontal direction and orthogonal to the direction X is referred to as a direction Y, and a vertical direction is referred to as a direction Z.

In the present embodiment, as illustrated in the example in FIG. 6, the user positional information is set under a condition that an area corresponding to the real object OR in the virtual local space LV and an area occupied by the virtual object OV in the virtual space SV overlap. More specifically, the user positional information is set using a known technique under a condition that a feature point or an area in the real object OR with respect to the user U in the real space SR and a feature point or an area of the virtual object OV with respect to the user UV in the virtual space SV overlap. In the example in FIG. 6, the example where the position and the orientation of the virtual local space LV are shifted in the virtual space SV; however, the example is not limited thereto and the position and the orientation of the virtual local space LV may be fixed and the position and the orientation of the virtual space SV may be shifted and set. Superimposition of the feature point or the area in the real object OR with respect to the user U and the feature point or the area of the virtual object OV with respect to the user UV is not limited to strict agreement between the feature points or the areas and it may refer to an approximate match between the feature points or the areas.

In the present embodiment, as for the user positional information, the position and the orientation of the virtual local space LV in the virtual space SV are set based on a given condition that the feature point or the area of the real object OR in the virtual local space LV and the feature point or the area of the virtual object OV in the virtual local space SV overlap. More specifically, as for the user positional information, a position and an orientation are extracted by a given method from among a position and an orientation of the virtual local space LV in the virtual space SV that meet the given condition and the position and the orientation are set as a correspondence relationship between the coordinate system of the virtual space SV and the coordinate system of the real space SR. When the feature point or the area of the real object OR and the feature point or the area of the virtual object OV do not match, a positon and an orientation by which a displacement of the user UV from the initial setting position in the virtual local space SV is at minimum from among the positions and orientations that meet the given condition are set for the user positional information. The method of extracting a position and an orientation of the virtual local space LV is not limited to this and a position and an orientation may be set by an operation performed by the user U via the input unit 20.

The user position acquisition unit 44 may acquire the user positional information when the user U makes a motion that meets a given condition. In other words, in the present embodiment, the motion made by the user U that meets the given condition triggers the user position acquisition unit 44 to set the user positional information. In this case, the position of the virtual local space LV is fixed in the virtual space SV and the position of the virtual object OV with respect to the user UV in the virtual space SV is set such that the position corresponds to the position of the real object OR with respect to the user U in the real space SR. The motion of the user U that meets the given condition may be any motion and, for example, performing a given operation on the input unit 20 by the user U, making a behavior of touching or putting the weight on a given real object OR, and making a behavior by the user U in the virtual space SV, such as riding on a vehicle in the virtual space SV, are presented.

In the virtual space SV, when a plurality of users UV are arranged, the display device 10 of each user U may make the positions of a smaller number of virtual objects OV than the number of the users correspond to the positions of real objects OR in a plurality of real local spaces. When a plurality of users UV share one virtual object OV (for example, when a plurality of users UV in the same virtual space SV share one desk because of, for example, a meeting), each virtual local space LV is arranged in the virtual space SV such that the feature point or the area of the real object OR in each virtual local space LV and the feature point or the area of the virtual object OV in the virtual space SV overlap.

According to the description above, the user positional information is set under the condition that the feature point or the area of the real object OR in the virtual local space LV and the feature point or the area of the virtual object OV in the virtual space SV overlap two-dimensionally; however the dimensions are not limited to two dimensions. For example, the user positional information may be set under the condition that the feature point or the area of the real object OR in the virtual local space LV and the feature point or the area of the virtual object OV in the virtual space SV overlap three-dimensionally.

Providing Unit

The providing unit 46 provides the virtual space SV to the user U based on the user positional information. The providing unit 46 sets the position presented by the user positional information for the position of the user UV in the virtual space SV and then provides the virtual space SV to the user U. Specifically, the providing unit 46 acquires information on the position and the orientation of the user U in the real space SR and converts the position and the orientation of the user U in the real space SR into a position and an orientation of the point of view of the user UV presented by the user positional information in the coordinate system of the virtual space SV. The providing unit 46 causes the display unit 22 to display an image of the virtual space SV in the case where the virtual space SV is viewed from the calculated position and posture of the point of view of the user U as an image for the virtual space SV.

As described above, the position and the posture of the point of view of the user UV in the virtual space SV reflect the position and the posture of the user U in the real space SR. Accordingly, when the user U shifts in the real space SR, the position and the posture of the point of view of the user UV in the virtual space SV shift, too. In this case, the amount of shift of the user U in the real space SR and the amount of shift of the point of view of the user UV in the virtual space SV are preferably made match. More specifically, when the user positional information is set, in the case where the size of the virtual local space LV with respect to the real local space LR is changed, the amount of shift preferably reflects the degree of change of the virtual local space LV in size. Specifically, when a rate at which the size of the virtual local space LV with respect to the real local space LR is changed (scale) is a change rate, the providing unit 46 causes the display unit 22 to display an image for the virtual space SV, assuming that the point of view of the user U shifts in the virtual space SV by the amount of shift obtained by multiplying the amount of shift by which the user U shifts in the real space SR by an inverse of the change rate. In other words, the providing unit 46 causes the display unit 22 to display the image for the virtual space SV from the point of view that shifts by the amount of shift obtained by multiplying the amount of shift by which the user U shifts in the real space SR by an inverse of the change rate. For example, in the case where the size of the virtual local space LV is doubled when the user positional information is set, the providing unit 46 causes the display unit 22 to display an image for the virtual space SV from the point of view that shifts by the amount of shift obtained by multiplying the amount of shift by which the user U shifts in the real space SR by ½.

The providing unit 46 may display an image representing the real object OR in the virtual space SV such that the image is superimposed onto the virtual object OV. Based on the shape information on the virtual object OV and the shape information on the real object OR, the providing unit 46 may determine whether to display the image representing the real object OR in the virtual space SV and, when it is determined to display, display the image representing the real object OR in the virtual space SV. For example, when the size of the virtual object OV is larger than the size of the real object OR, the providing unit 46 may display the image representing the real object OR in the virtual space SV such that the image is superimposed onto the virtual object OV. In this case, the display unit 22 may provide AR (Augmented Reality) displaying the image for the virtual space SV through the real space SR or may display the image for the virtual space SV and the image representing the real object OR in a superimposed manner. Part of the virtual object OV not overlapping the real object OR may be deleted from the image for the virtual space SV or information on the part may be presented as an area that is not associated with the real object OR.

Flowchart

Figure 7:
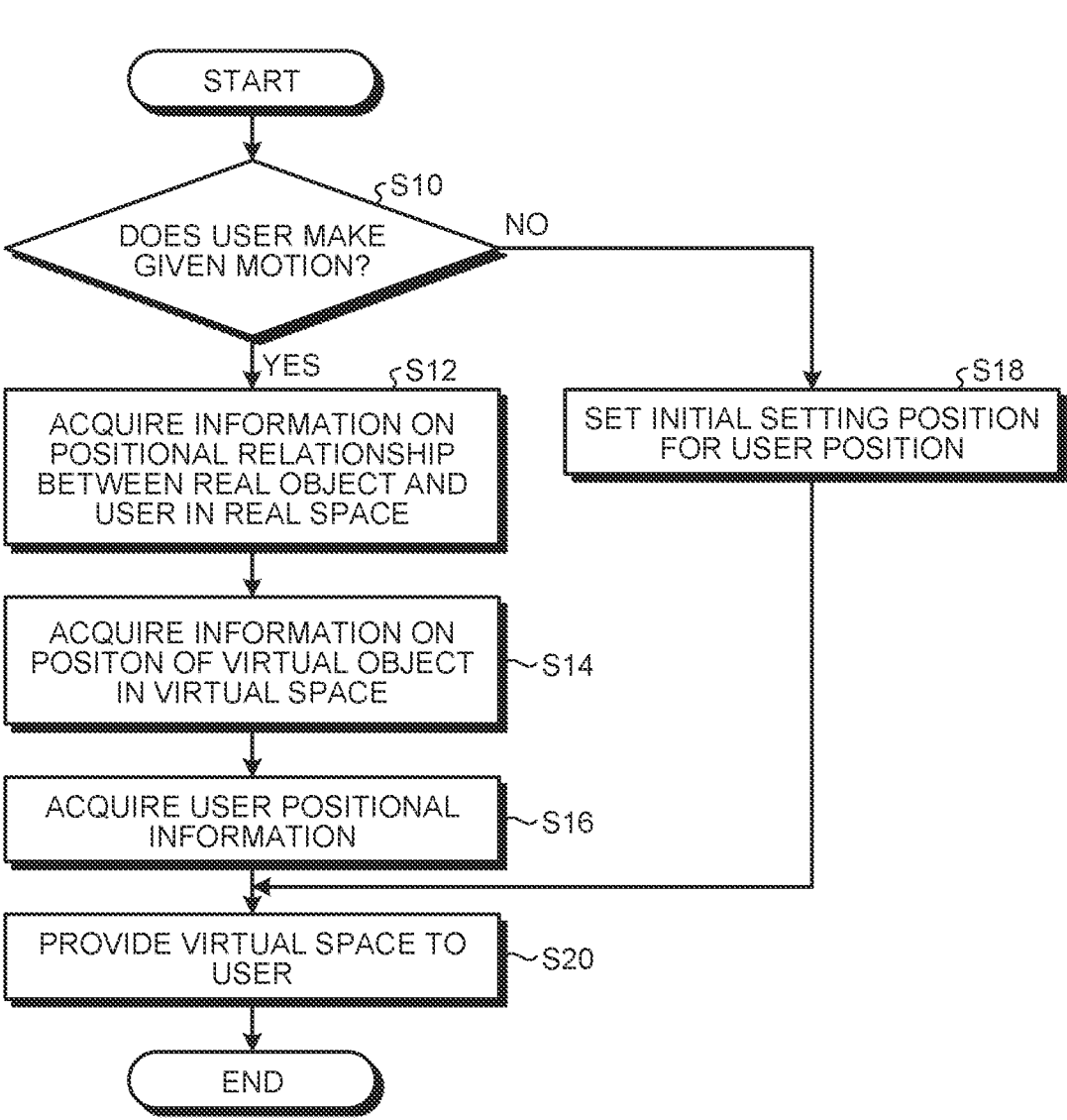
FIG. 7 is a flowchart according to the present embodiment.

FIG. 7 is a flowchart according to the embodiment. When the user U makes a given motion (Step S10: Yes), the real object information acquisition unit 40 acquires information on a real object OR via the real space detection unit 28 (step S12). The virtual object information acquisition unit 42 acquires information on a virtual object OV from the information processing device 12 (step S14). The user position acquisition unit 44 sets user positional information based on the information on the real object OR and the information on the virtual object OV (step S16). The providing unit 46 sets a position that the user positional information presents for the position of a user UV in a virtual space SV and provides the virtual space SV to the user U (step S20). On the other hand, when the user U does not make the given motion (step S10: No), the user position acquisition unit 44 sets an initial setting position for the position of the user UV in the virtual space SV and provides the virtual space SV to the user U (step S18).

Note that, in the present embodiment, the display device 10 used by the user U sets the user positional information; however, the subject that sets the user positional information is not limited to the display device 10, and the information processing device 12 may make the setting. In this case, the information processing device 12 acquires information on the real object OR from the display device 10 and sets the user positional information from the information on the real object OR and the information on the virtual object OV that is set by the information processing device 12. The user position acquisition unit 44 of the display device 10 acquires the user positional information from the information processing device 12.

In the virtual space SV, the motion of the user UV in the virtual space SV reflects the motion of the user U in the real space SR. For example, in the case where the virtual space SV is set regardless of the layout in the real space, or the like, however, the motions of the user U in the virtual space SV are unnatural in some cases. For example, in the case where the user sits in front of the desk in the real space SR, when there is no desk in spot in the virtual space SV, another user in the virtual space SV views that the user UV is sitting in a spot with nothing in some cases. On the other hand, according to the embodiment, appropriately setting the position of the user UV in the virtual space SV makes it possible to make the position of the real object OR with respect to the user U in the real space SR and the position of the virtual object OV with respect to the user UV in the virtual space SV match. This makes it possible to show the behavior (for example, the behavior of the user UV that is sitting in front of the desk that is the virtual object OV) natural in the virtual space SV. This enables the user U in the real space SR to take a behavior of dealing with the virtual object OV as dealing with the real object OR (for example, the behavior of placing an object in the real space SR while viewing the desk that is the virtual object OV), thereby making the behavior of the user U natural in the virtual space SV.

Another Example of Method of Setting User Positional Information

In the embodiment, it has been described that the user positional information is set by adjusting the position and the orientation of the virtual local space LV in the virtual space SV based on the difference between the coordinates of the user U and the coordinates of the real object OR in the real local space LR and the coordinates of the virtual object OV in the virtual space SV; however, the method of setting user positional information is not limited to this. Another example will be described below.

For example, the real object information acquisition unit 40 may acquire relative coordinates of the real object OR with the user U serving as the origin as information on the positional relationship of the real object OR with respect to the user U. In this case, when the user U moves in the real space SR, the relative coordinates of the real object OR change.

The virtual object information acquisition unit 42 may acquire the relative coordinates of the virtual object OV with the user UV serving as the origin as information on the position of the virtual object OV. In this case, when the user UV moves in the virtual space SV, the relative coordinates of the virtual object OV change.

When the relative coordinates of the real object OR with the user U serving as the origin are acquired, the user positional information may be set by making the relative coordinates of the virtual object OV with the user UV serving as the origin directly match the relative coordinates of the real object OR with the user U serving as the origin.

Effects

A display device, a method of controlling a display device, and a program described in each embodiment, for example, are grasped as follows.

The display device in a first mode includes the real object information acquisition unit 40 that acquires information on a position of a real object OR that is an object in a real space SR in which a user U exists and information on a positional relationship between the real object OR and the user U, the position being in the real space SR and the positional relationship being in the real space SR; the virtual object information acquisition unit 42 that acquires information on a position of a virtual object OV that is an object in s virtual space SV, the position being in the virtual space SV; and the user position acquisition unit 44 that match positions an postures of the real object OR and the virtual object OV and, based on the information on the positional relationship in the real space SR, calculates a positional relationship between the virtual object OV and a user UV in the virtual space SV in the virtual space SV and, based on the positional relationship in the virtual space SV, acquires user positional information indicating a position of the user UV in the virtual space SV. According to the configuration, it is possible to make the position of the real object OR with respect to the user U and the positon of the virtual object OV with respect to the user UV match. Accordingly, it is possible to make behaviors of the user U natural in the virtual space SV.

The display device in a second mode includes the providing unit 46 that provides a virtual space SV to the user U based on the user positional information and the providing unit 46 displays an image representing the real object OR in the virtual space SV such that the real object OR is superimposed onto the virtual object OV. Accordingly, even when the real object OR and the virtual object OV are different in size, because the user U is able to recognize an area of the real object OR in the virtual space SV, it is possible to make behaviors of the user U more natural in the virtual space SV.

In the display device in a third mode, the virtual object information acquisition unit 42 extracts the virtual object OV based on a shape of the real object OR and a shape of the virtual object OV. Accordingly, because it possible to set the position of the user UV more appropriately by using the virtual object OV similar to the real object OR as a reference, it is possible to make behaviors of the user U more natural in the virtual space SV.

In the display device in a fourth mode, the user position acquisition unit 44 acquires the user positional information when the user U makes a motion that meets a given condition. Accordingly, because it is possible to appropriately set the position of the user UV in the virtual space SV as required, it is possible to make behaviors of the user U more natural in the virtual space SV.

A method of controlling a display device in a fifth mode includes: a step of acquiring information on a position of a real object OR that is an object in a real space SR in which a user U exists and information on a positional relationship between the real object OR and the user U, the position being in the real space SR and the positional relationship being in the real space SR; a step of acquiring information on a position of a virtual object OV that is an object in a virtual space SV, the position being in the virtual space SV; and a step of matching positions and postures of the real object OR and the virtual object OV and, based on the information on the positional relationship in the real space SR, calculating a positional relationship between the virtual object OV and the user UV in the virtual space SV in the virtual space SV and, based on the positional relationship in the virtual space SV, acquiring user positional information indicating a position of the user UV in the virtual space SV.

A program in a sixth mode causes a computer to execute a step of acquiring information on a position of a real object OR that is an object in a real space SR in which a user U exists and information on a positional relationship between the real object OR and the user U, the position being in the real space SR and the positional relationship being in the real space SR; a step of acquiring information on a position of a virtual object OV that is an object in a virtual space SV, the position being in the virtual space SV; and a step of matching positions and postures of the real object OR and the virtual object OV and, based on the information on the positional relationship in the real space SR, calculating a positional relationship between the virtual object OV and the user UV in the virtual space SV in the virtual space SV and, based on the positional relationship in the virtual space SV, acquiring user positional information indicating a position of the user UV in the virtual space SV.

The embodiment has been described and the content of these embodiments does not limit embodiments. The above-described components include those easily assumed by those skilled in the art and those substantially the same, that is, in a range of equivalence. Furthermore, the components described above can be combined as appropriate and the configuration of each of the embodiments can be combined. Furthermore, it is possible to make various omissions, replacements, and changes of the components without departing from the scope of the embodiment.

The program for performing the method of controlling a display device described above may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

According to the present embodiment, it is possible to make behaviors of a user natural in a virtual space.

The display device, the method of controlling a display device, and the program of the embodiment, for example, are usable for image display.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
a real object information acquisition unit configured to acquire information on a position of a real object in a real space in which a user exists and information on a positional relationship in the real space between the real object and the user, the position being in the real space;
a virtual object information acquisition unit configured to acquire information on a position of a virtual object in a virtual space, the position being in the virtual space; and
a user position acquisition unit configured to
match the position of the real object and the position of the virtual object,
match postures of the real object and the virtual object,
calculate a positional relationship in the virtual space between the virtual object and the user in the virtual space based on the information on the positional relationship in the real space, and
acquire, in response to a determination that the user in the real space has touched the real object, user positional information indicating a position of the user in the virtual space based on the positional relationship in the virtual space.

2. The display device according to claim 1, further comprising a providing unit configured to
provide the virtual space to the user based on the user positional information, and
display an image representing the real object in the virtual space so that the real object is superimposed onto the virtual object.

3. The display device according to claim 1, wherein the virtual object information acquisition unit is configured to extract the virtual object based on a shape of the real object and a shape of the virtual object.

4. A method of controlling a display device comprising:
acquiring information on a position of a real object in a real space in which a user exists and information on a positional relationship in the real space between the real object and the user, the position being in the real space;
acquiring information on a position of a virtual object in a virtual space, the position being in the virtual space;
matching the position of the real object and the position of the virtual object;
matching postures of the real object and the virtual object;
calculating a positional relationship in the virtual space between the virtual object and the user in the virtual space based on the information on the positional relationship in the real space; and
in response to determining that the user in the real space touches the real object, acquiring user positional information indicating a position of the user in the virtual space based on the positional relationship in the virtual space.

5. A non-transitory computer-readable storage medium storing a program causing a computer to execute:
acquiring information on a position of a real object in a real space in which a user exists and information on a positional relationship in the real space between the real object and the user, the position being in the real space;
acquiring information on a position of a virtual object in a virtual space, the position being in the virtual space;
matching the position of the real object and the position of the virtual object;

matching postures of the real object and the virtual object;

calculating a positional relationship in the virtual space between the virtual object and the user in the virtual space based on the information on the positional relationship in the real space; and acquiring, in response to a determination that the user in the real space has touched the real object, user positional information indicating a position of the user in the virtual space based on the positional relationship in the virtual space.

* * * * *